(12) United States Patent
Madej (10) Patent No.: US 7,563,063 B1
(45) Date of Patent: Jul. 21, 2009

(54) MULTIPURPOSE FASTENER KIT AND ASSOCIATED ACCESSORIES

(76) Inventor: Steve Madej, 7480 Kimbel Street Unit #1, Mississauga, B8 L5S 1A5 (CA)

( * ) Notice: Subject to any disclaimer, the term of this patent is extended or adjusted under 35 U.S.C. 154(b) by 283 days.

(21) Appl. No.: 11/363,466

(22) Filed: Feb. 28, 2006

(51) Int. Cl.
 *F16B 21/00* (2006.01)
(52) U.S. Cl. ........................................ 411/339; 411/512
(58) Field of Classification Search ................ 411/338, 411/339, 512, 399; 24/108
See application file for complete search history.

(56) References Cited

U.S. PATENT DOCUMENTS

| | | | |
|---|---|---|---|
| 863,543 A * | 8/1907 | Lomax | 24/110 |
| 1,037,010 A | 8/1912 | Irons | |
| 1,336,243 A * | 4/1920 | Lee | 24/108 |
| 1,374,713 A * | 4/1921 | Bell | 411/338 |
| 1,686,780 A * | 10/1928 | Wigginton | 281/27.3 |
| 1,900,601 A * | 3/1933 | Felder | 402/61 |
| 1,978,087 A | 10/1934 | Johnson | |
| 2,118,561 A * | 5/1938 | Kleeberg | 411/338 |
| 2,367,657 A | 1/1945 | Boersma | |
| 2,590,175 A * | 3/1952 | Hajdu | 411/61 |
| 3,462,114 A * | 8/1969 | O'Dell, Jr. et al. | 249/195 |
| 3,702,087 A * | 11/1972 | Schmitt | 411/362 |
| 4,033,243 A * | 7/1977 | Kirrish et al. | 411/338 |
| 4,246,679 A * | 1/1981 | Monett | 24/587.11 |
| 4,490,083 A * | 12/1984 | Rebish | 411/338 |
| 4,631,929 A * | 12/1986 | Hollingworth | 63/13 |
| 4,759,670 A * | 7/1988 | Linder et al. | 411/43 |
| 4,846,611 A * | 7/1989 | Sadri et al. | 411/43 |
| 5,143,500 A * | 9/1992 | Schuring et al. | 411/339 |
| 5,254,016 A * | 10/1993 | Ganthier | 439/567 |
| 5,718,025 A | 2/1998 | Courtin | |
| D437,209 S | 2/2001 | McDonough et al. | |
| 6,209,178 B1 | 4/2001 | Wiese et al. | |
| 6,505,386 B1 * | 1/2003 | Allie | 24/458 |

* cited by examiner

*Primary Examiner*—Flemming Saether (57) ABSTRACT

A fastener kit includes male clips that include bodies having a tapered bottom tip having a cone shape and an upper portion with a diameter equal to a bottom tip maximum diameter. A striking region is monolithically formed with the upper portion, has a greater diameter than the upper portion, and has a downwardly sloping outer edge. Female clips that are engageable about the male clips have cylindrical bodies provided with an axial bore extending therealong, an open end, and a closed end. The female body has a striking region formed at the closed end having a planar surface with an outwardly beveled outer edge. Selected female bodies have a fluted outer surface. The bore of the female body has a fluted interior surface for interlocking with the male body. Annular seals that are engageable about the male clips have beveled outer edges sloping away from a center thereof.

3 Claims, 15 Drawing Sheets

MULTIPURPOSE FASTENER KIT AND ASSOCIATED ACCESSORIES

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to fastener kits and, more particularly, to a multipurpose fastener kit and associated accessories.

2. Prior Art

Fastening clip for connecting two plate-shaped structural parts are known in the most varied of design embodiment forms and generally include a head that comprises a conical flange which more or less sealingly bears against the facing side of the structural part and is axially deformable in a limited manner in order to ensure a height compensation. On the head of the fastening clip there is formed a shank which consists of two or more legs which may be radially sprung and which at the free end run out into an introduction end and in each case comprise a shoulder radially on the outside, with which a hole edge is gripped from behind.

One disadvantage of most prior art examples of such fasteners is that their attachment often requires a considerable application force which however is mostly smaller than the holding force. The prior art fasteners are also further limited by being solely designed for vertically or horizontally passing through two adjoining plates. Such fasteners are not suitable for forming an angled connection point, thus greatly limiting the uses thereof. A third disadvantage of the prior art fasteners is the fact that the exposed surfaces thereof are often obvious and obtrusive, and are also easy points contact along which the fasteners can be pried out by an unauthorized person or persons tampering with the fastener.

Accordingly, a need remains for a multipurpose fastener kit and associated accessories in order to overcome the above-noted shortcomings. The present invention satisfies such a need by providing fasteners that are quickly and easily installed, convenient and efficient to use, versatile in the applications thereof, and are durable for extended periods of use. All versions of the fasteners are easily installed with the simple tap of a hammer, thus saving the user a considerable amount of time and energy. Such fasteners are produced in a variety of sizes and styles, and can be produced from various materials, depending on the intended application thereof. The exposed head surface features a conformal design that makes it visually appealing and unobtrusive, prevents it from being caught on items, and makes it virtually impossible to pry loose.

BRIEF SUMMARY OF THE INVENTION

In view of the foregoing background, it is therefore an object of the present invention to provide a multipurpose fastener kit and associated accessories. These and other objects, features, and advantages of the invention are provided by a fastener accessory kit for conveniently assisting a user to quickly and efficiently fasten a plurality of panels to each other.

The fastener accessory kit includes a plurality of male clips. Each of the male clips includes a body that has a monolithically formed and tapered bottom tip that has a rounded cone shape. Such a body further has an upper portion monolithically formed with the bottom tip that is provided with a uniform diameter equal to a maximum diameter of the bottom tip. The body further has a striking region monolithically formed with the upper portion. Such a striking region has a diameter greater than a diameter of the upper portion for advantageously and effectively providing a sufficient surface area onto which a hammer is struck when inserting the body into a panel. The striking region has a downwardly sloping outer edge equidistantly spaced from a center of the upper portion.

A plurality of female clips are included. Each of the female clips has a cylindrical body provided with an axial bore formed therein. Such an axial bore extends along an entire longitudinal length of the female body, wherein the female body has an open end portion and an axially opposed closed end portion. The striking region of the male clip is preferably directly connected to the open end portion of the female clip after the male clip is inserted into the bore of the female clip. The axial bore has a longitudinal length greater than a sum of associated longitudinal lengths of the bottom tip and the upper portion respectively. The female body further has a striking region monolithically formed with the closed end portion. Such a female striking region has a planar surface provided with an outwardly beveled outer edge. The striking surface is axially opposed from the open end portion. Selected ones of the female clip bodies have a fluted outer surface. The bore of the female body has a fluted or a smooth interior surface for effectively and statically interlocking with the male clip body.

A plurality of annular seals are included. Selected ones of the annular seals have beveled outer edges sloping away from a center thereof for advantageously and conveniently assisting a user to slidably insert the male clip bodies directly into the female clip bores respectively. Such seals are directly engageable about the male clips and the male clips are selectively engageable with associated ones of the female clips.

In an alternate embodiment, selected ones of the bodies of the male clips may further include an elongated shank that is directly conjoined to the upper portion and extends axially upwards therefrom. Such a shank is spaced from the bottom tip and has a uniform diameter smaller than the maximum diameter of the bottom tip. A plug region is monolithically formed with the shank and the striking regions respectively. Such a plug region has a rounded bottom edge converging downwardly towards the shank. The plug region further has a diameter smaller than a diameter of the striking region.

In such an alternate embodiment, the upper portion of the male clips preferably have a horizontally registered outer shoulder continuously and uniformly extending about an outer surface of the shaft for effectively and conveniently receiving the annular seals and supporting the annular seals directly about the shaft respectively. The female body has a plurality of linear slits formed therein that travel parallel to the longitudinal length thereof such that a diameter of the female body can effectively be adapted between compressed and expanded positions and thereby uniformly and directly engage the male clips.

In a further embodiment, selected ones of the male and female clips may have a fluted outer ring monolithically formed about the plug section and the cylindrical body, respectively, for advantageously and effectively preventing the beveled outer edge from bending inwardly beyond a predetermined threshold.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures. Alternate embodiments are designated by alphanumeric references.

The apparatus of this invention is referred to generally in FIGS. 1-27 by the reference numeral 10 and is intended to provide a multipurpose fastener kit and associated accessories. It should be understood that the apparatus 10 may be used to connect many different types of panels and should not be limited in use to only connected metal panels.

Referring initially to FIGS. 22, 23, 26 and 27, the apparatus 10 includes a plurality of male clips 20. Each of the male clips 20 includes a body 21 that has a monolithically formed and tapered bottom tip 22 that has a rounded cone shape. Such a body 21 further has an upper portion 23 monolithically formed with the bottom tip 22 that is provided with a uniform diameter equal to a maximum diameter of the bottom tip 22. The body 21 further has a striking region 24 monolithically formed with the upper portion 23. Such a striking region 24 has a diameter greater than a diameter of the upper portion 23 that is vital for advantageously and effectively providing a sufficient surface area onto which a hammer is struck when inserting the body 21 into a panel 11. The striking region 24 has a downwardly sloping outer edge 25 equidistantly spaced from a center of the upper portion 23. Of course, the male clip 20 may be produced in a variety of shapes, diameters and styles depending on the intended application thereof, as is obvious to a person of ordinary skill in the art.

Referring to FIGS. 24, 25, 26 and 27, a plurality of female clips 30 are included. Each of the female clips 30 has a cylindrical body 31 provided with an axial bore 32 formed therein. Such an axial bore 32 extends along an entire longitudinal length of the female body 31 wherein the female body 31 has an open end portion 33 and an axially opposed closed end portion 34. The striking region 24 of the male clip 20 is directly connected, without the use of intervening elements, to the open end portion 33 of the female clip 30 after the male clip 20 is inserted into the bore 32 of the female clip 30, thus ensuring that a complete, tight and waterproof seal is formed between the male 20 and female 30 clips.

The axial bore 32 has a longitudinal length greater than a sum of associated longitudinal lengths of the bottom tip 22 and the upper portion 23 respectively. The female body 31 further has a striking region 35 monolithically formed with the closed end portion 34. Such a female striking region 35 has a planar surface 36 provided with an outwardly beveled outer edge 37. The striking region 35 is axially opposed from the open end portion 33. Selected ones of the female clip bodies 31 have a fluted outer surface 38. The bore of the female body has a smooth or fluted interior surface for effectively and statically interlocking with the male clip body. Of course, the female clip 30 may be produced in a variety of shapes, diameters and styles depending on the intended application thereof, as is obvious to a person of ordinary skill in the art.

Referring to FIGS. 28-31, a plurality of annular seals 40, 40', 40", 40''' are included in the kit 10. Selected ones of the annular seals 40', 40" have beveled outer edges 41', 41" sloping away from a center thereof for that are essential and advantageous for conveniently assisting a user to slidably insert the male clip bodies 21 directly into the female clip bores 32 respectively. The seals 40, 40', 40", 40''' are directly engageable, without the use of intervening elements, about the male clips 20 and the male clips 20 are selectively engageable with associated ones of the female clips 30. Seals 40', 40" and 40''' are provided with a slit for bifurcating their bodies into separate sections so that the seals 40', 40" and 40''' can be adapted to alternate diametrical shapes as needed during installation and removal procedures.

Referring to FIGS. 1, 2, 3, 18 and 19, in an alternate embodiment 10A, selected ones of the bodies 21A of the male clips 20A further include an elongated shank 26 that is directly conjoined, without the use of intervening elements, to the upper portion 23A and extends axially upwards therefrom. Such a shank 26 is spaced from the bottom tip 22A and has a uniform diameter smaller than the maximum diameter of the bottom tip 22A. A plug region 27 is monolithically formed with the shank 26 and the striking regions 24A respectively. Such a plug region 27 has a rounded bottom edge 28 converging downwardly towards the shank 26. The plug region 27 further has a diameter smaller than a diameter of the striking region 24A.

Still referring to FIGS. 1, 2, 3, 18 and 19, in such an alternate embodiment 10A, the upper portion 23A of the male clips 20A have a horizontally registered outer shoulder 29 continuously and uniformly extending about an outer surface of the shank 26 that is crucial for effectively and conveniently receiving the annular seals 40 and supporting the annular seals 40 directly, without the use of intervening elements, about the shank 26 respectively. The female body 31A has a plurality of linear slits 39 formed therein that travel parallel to the longitudinal length thereof, which is important such that a diameter of the female body 31A can effectively be adapted between compressed and expanded positions and thereby uniformly and directly engage, without the use of intervening elements, the male clips 20A.

Referring to FIGS. 10, 11, 20 and 21, in a further embodiment 10B, selected ones of the male clips 20B have a fluted outer ring 51 monolithically formed about the plug region 27B that is critical for advantageously and effectively preventing the beveled outer edge 37 from bending inwardly beyond a predetermined threshold. In such an embodiment 10B, the female clip 30B has a fluted outer ring 54 monolithically formed with the female body 31B thereof. The female body fluted outer ring 54 is positioned subjacent to the striking region 35B. Such a fluted outer ring 54 is important for preventing the female clip 30B from rotating within the aperture 12.

Figure 1:
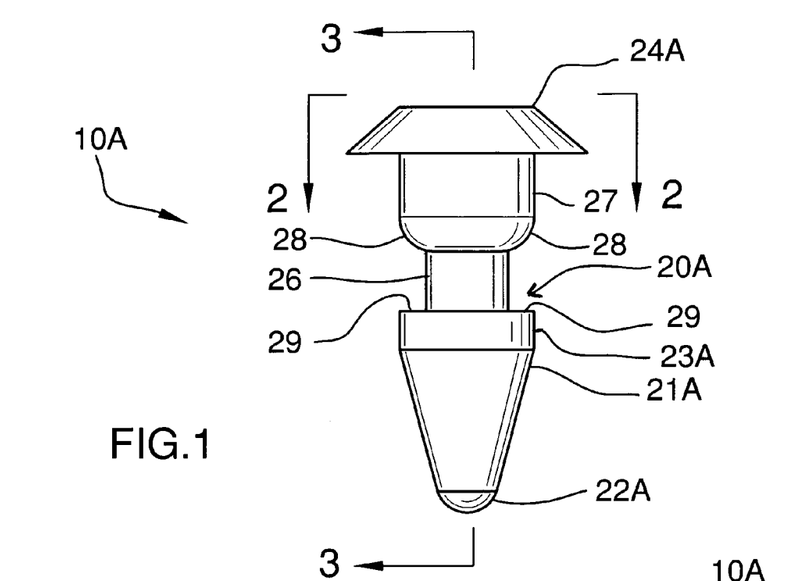
FIG. 1 is a front-elevational view showing an alternate embodiment of the male clip of the multipurpose fastener kit and associated accessories, in accordance with the present invention.
Figure 2:
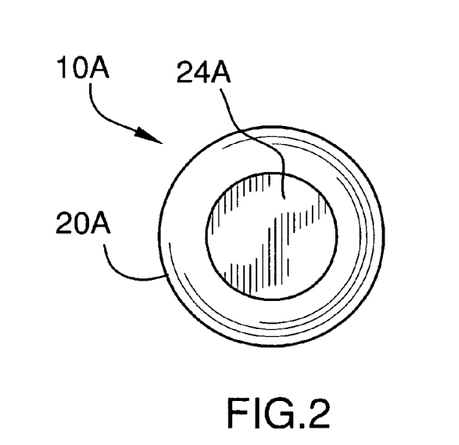
FIG. 2 is a top plan view of the male clip shown in FIG. 1, viewed along line 2-2.
Figure 3:
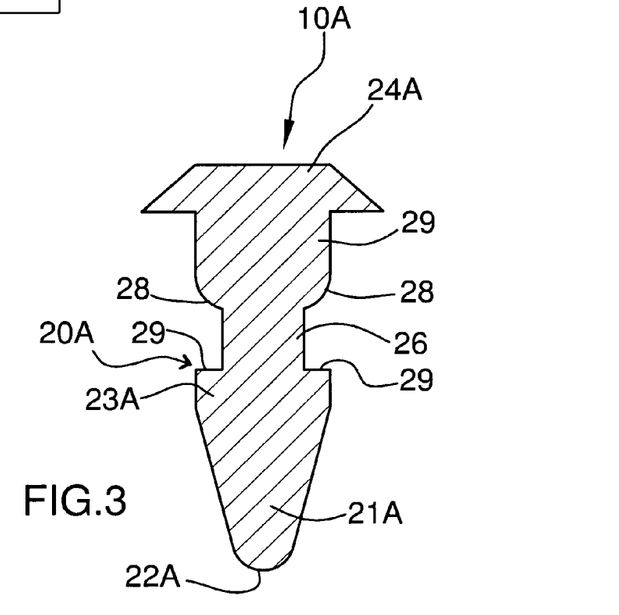
FIG. 3 is a cross-sectional view of the male clip shown in FIG. 1, taken along line 3-3.
Figure 4:
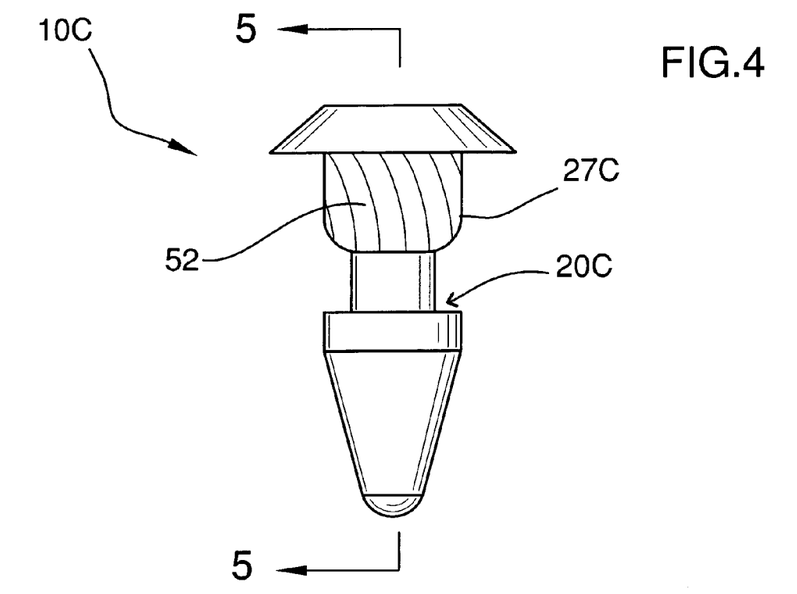
FIG. 4 is a front-elevational view showing a fourth embodiment of the male clip, in accordance with the present invention.
Figure 5:
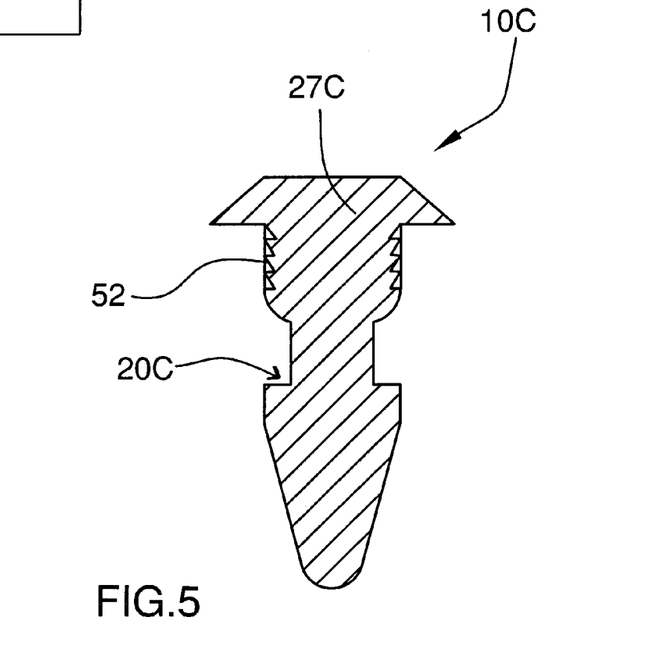
FIG. 5 is a cross-sectional view of the male clip shown in FIG. 4, taken along line 5-5.

Referring to FIGS. 4 and 5, in a fourth embodiment 10C, the plug regions 27C have a fluted outer surface 52, which is vital and advantageous for preventing the male clip 20C from rotating within the aperture 12 that same is inserted through.

Figures 6, 7:
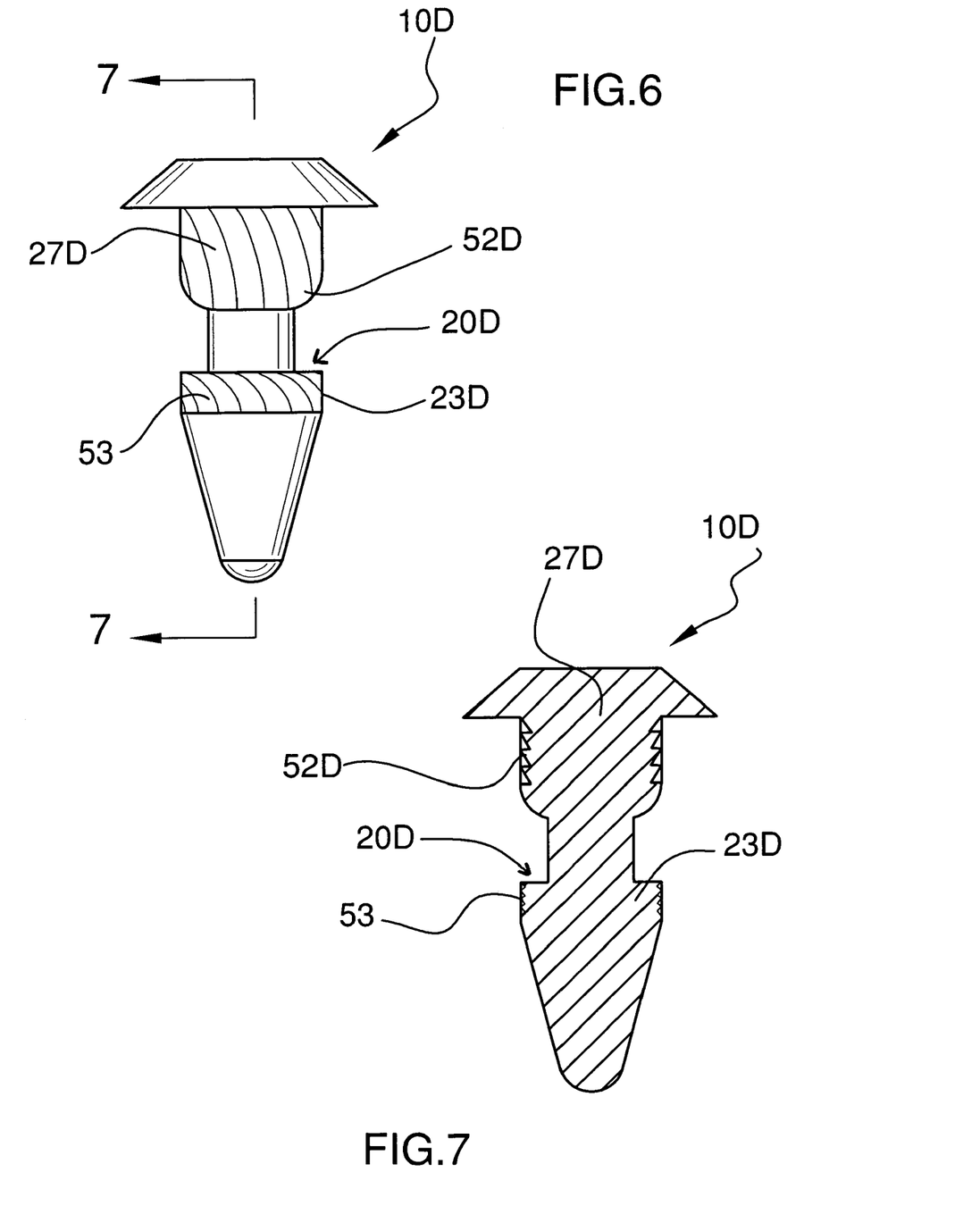
FIG. 6 is a front-elevational view showing a fifth embodiment of the male clip, in accordance with the present invention.
FIG. 7 is a cross-sectional view of the male clip shown in FIG. 6, taken along line 7-7.

Referring to FIGS. 6 and 7, in a fifth embodiment 10D, the upper portion 23D and the plug region 27D have fluted outer surfaces 53, 52D, respectively. Such a combination of fluted outer surfaces 53, 52D is essential for preventing the male clip 20D from rotating within the female clip 30A and the aperture 12, respectively.

Figure 8:
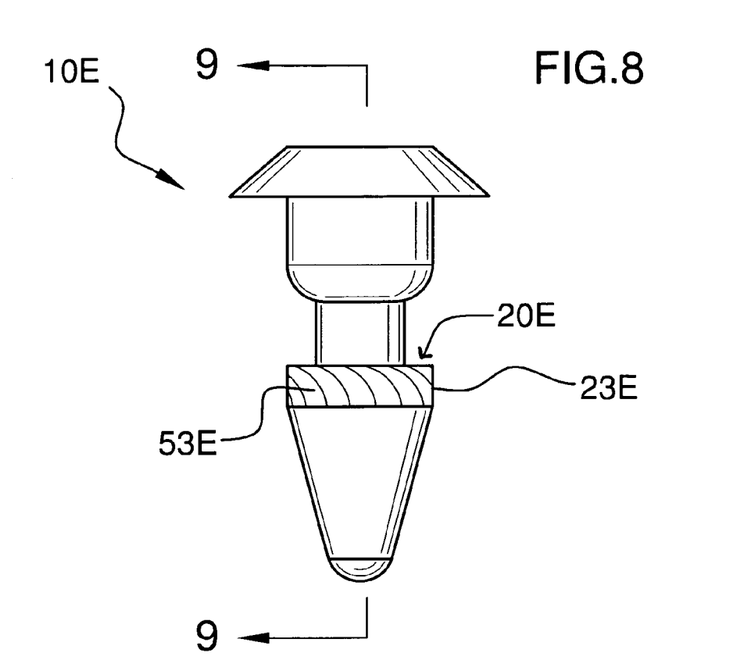
FIG. 8 is a front-elevational view showing a sixth embodiment of the male clip, in accordance with the present invention.
Figure 9:
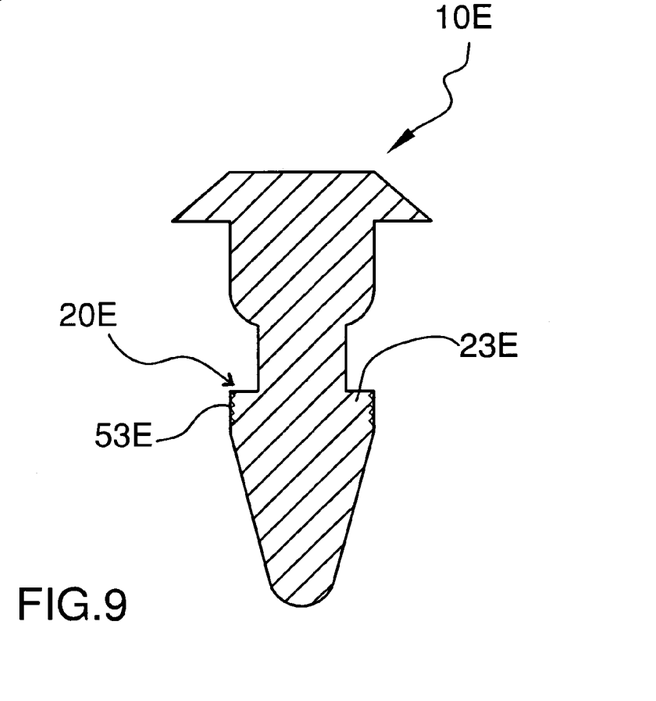
FIG. 9 is cross-sectional view of the male clip shown in FIG. 8, taken along line 9-9.
Figure 10:
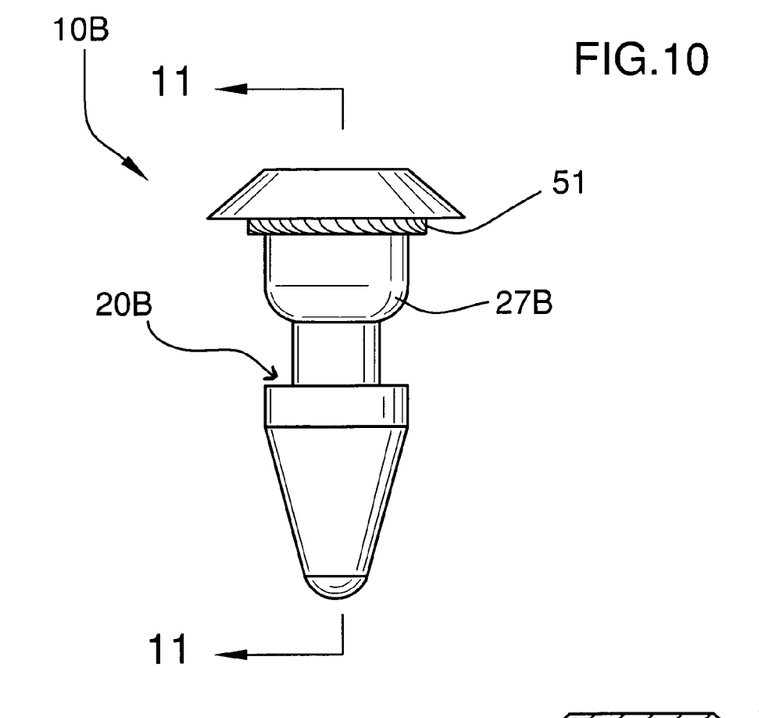
FIG. 10 is a front-elevational view showing a further embodiment of the male clip, in accordance with the present invention.
Figure 11:
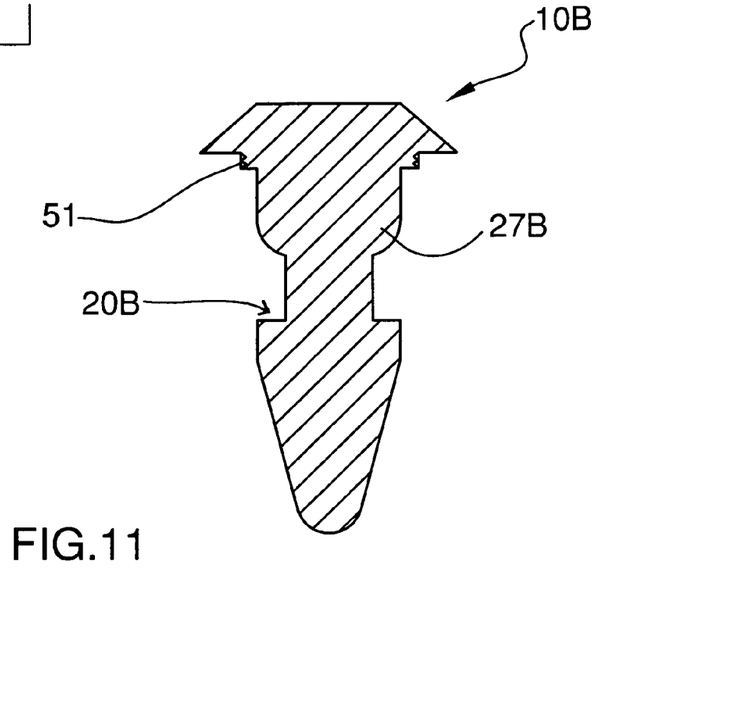
FIG. 11 is cross-sectional view of the male clip shown in FIG. 10, taken along line 11-11.

Referring to FIGS. 8 and 9, in a sixth embodiment 10E, the upper portion 23E of the male clip 20E includes a fluted outer surface 53E that is important for preventing the male clip 20E from rotating within the female clip 30A.

Figures 12, 13:
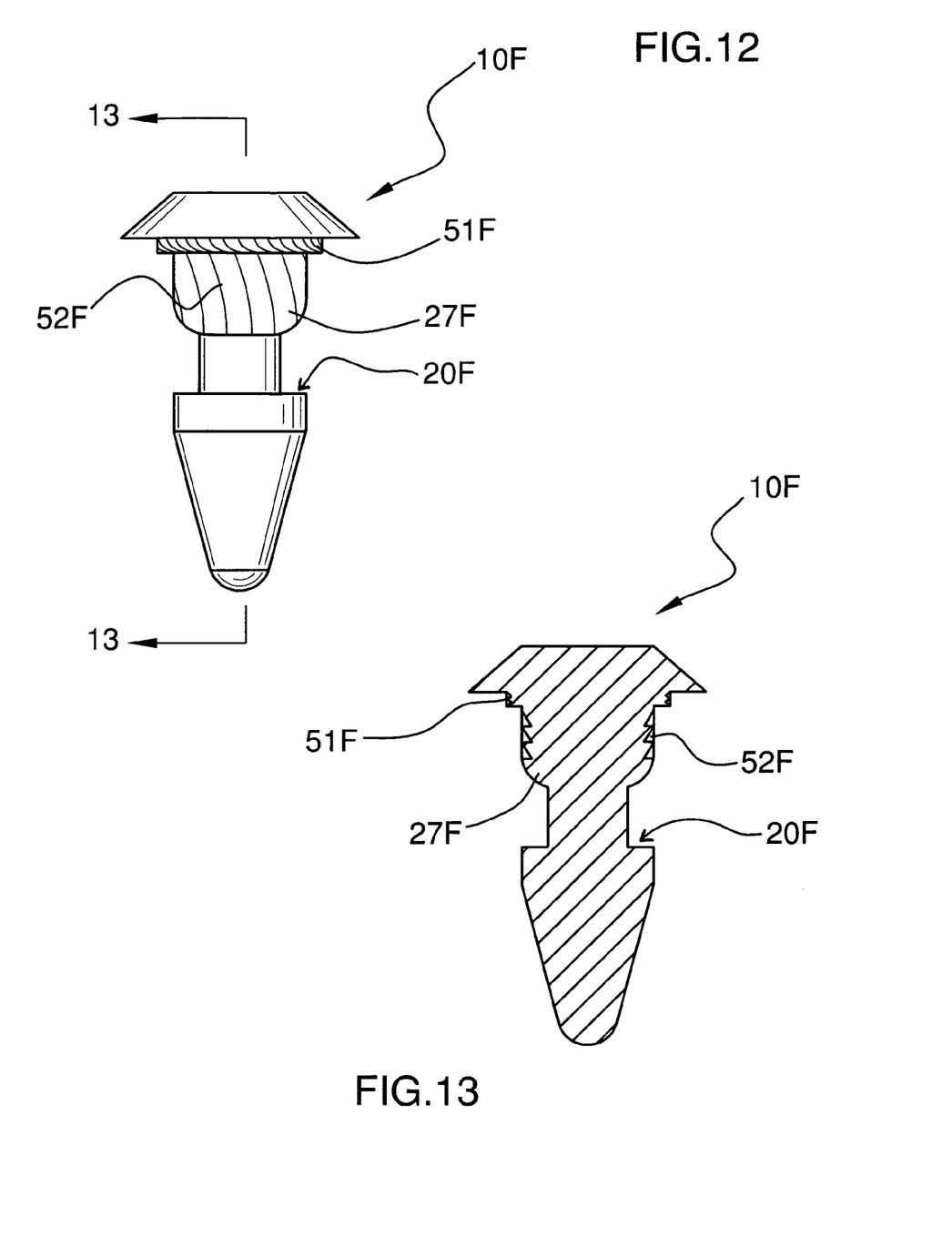
FIG. 12 is a front-elevational view showing a seventh embodiment of the male clip, in accordance with the present invention.
FIG. 13 is a cross-sectional view of the male clip shown in FIG. 12, taken alone line 13-13.

Referring to FIGS. 12 and 13, in a seventh embodiment 10F, the plug portion 27F has a fluted outer surface 52F. Such a plug portion has a fluted outer ring 51F monolithically formed therewith. The combination of a fluted outer surface 52 F of the plug region 27F and the fluted outer ring 51F is critical for preventing the male clip 20F from rotating within the aperture 12 and the annular seal, respectively.

Figures 14, 15:
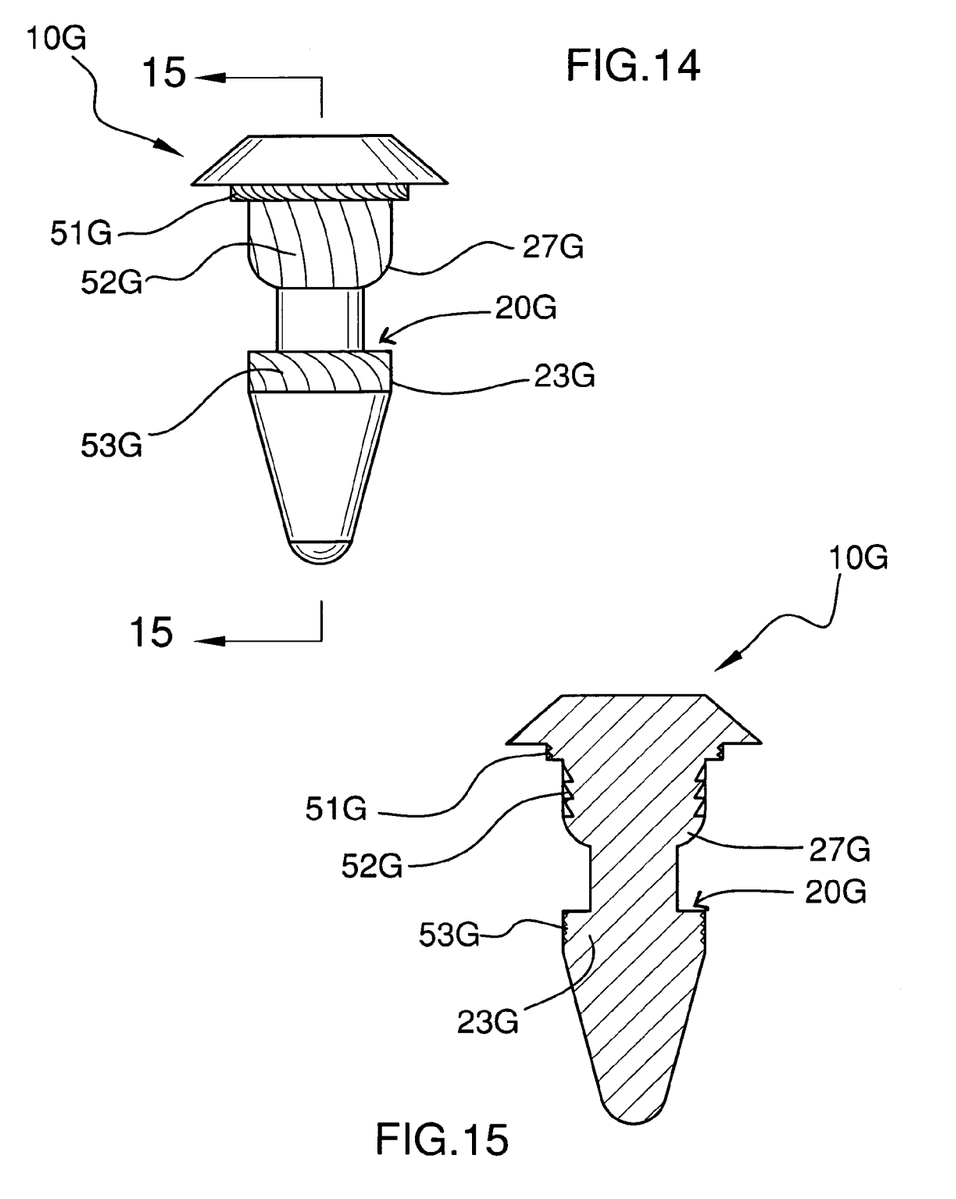
FIG. 14 is a front-elevational view showing an eighth embodiment of the male clip, in accordance with the present invention.
FIG. 15 is a cross-sectional view of the male clip shown in FIG. 14, taken along line 15-15.

Referring to FIGS. 14 and 15, in an eighth embodiment 10G, the male clip 20G includes an upper portion 23G that has a fluted outer surface 53G. Such a male clip 20G further includes a plug region 27G that has fluted outer surface 52G. The plug region 27G has a fluted outer ring 51G monolithically formed therewith. Such a combination of an upper portion fluted outer surface 53D, a plug region fluted outer surface 52G and a fluted outer ring 51G are essential for preventing the male clip 20 from rotating within the female clip 30A, the aperture 12, and the annular seal 40, respectively.

Figures 16, 17:
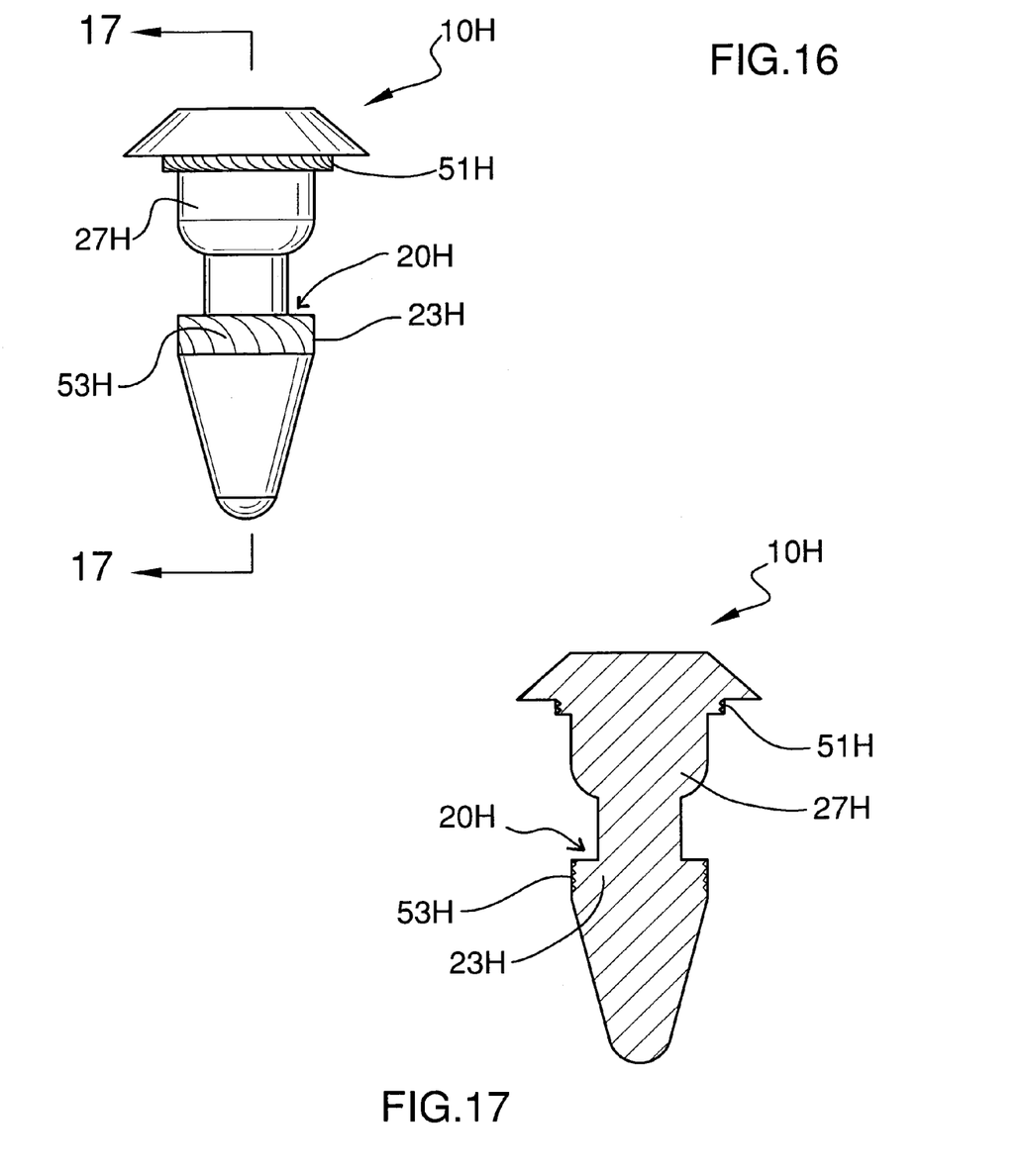
FIG. 16 is a front-elevational view showing a ninth embodiment of the male clip, in accordance with the present invention.
FIG. 17 is a cross-sectional view of the male clip shown in FIG. 16, taken along line 17-17.
Figures 18, 19:
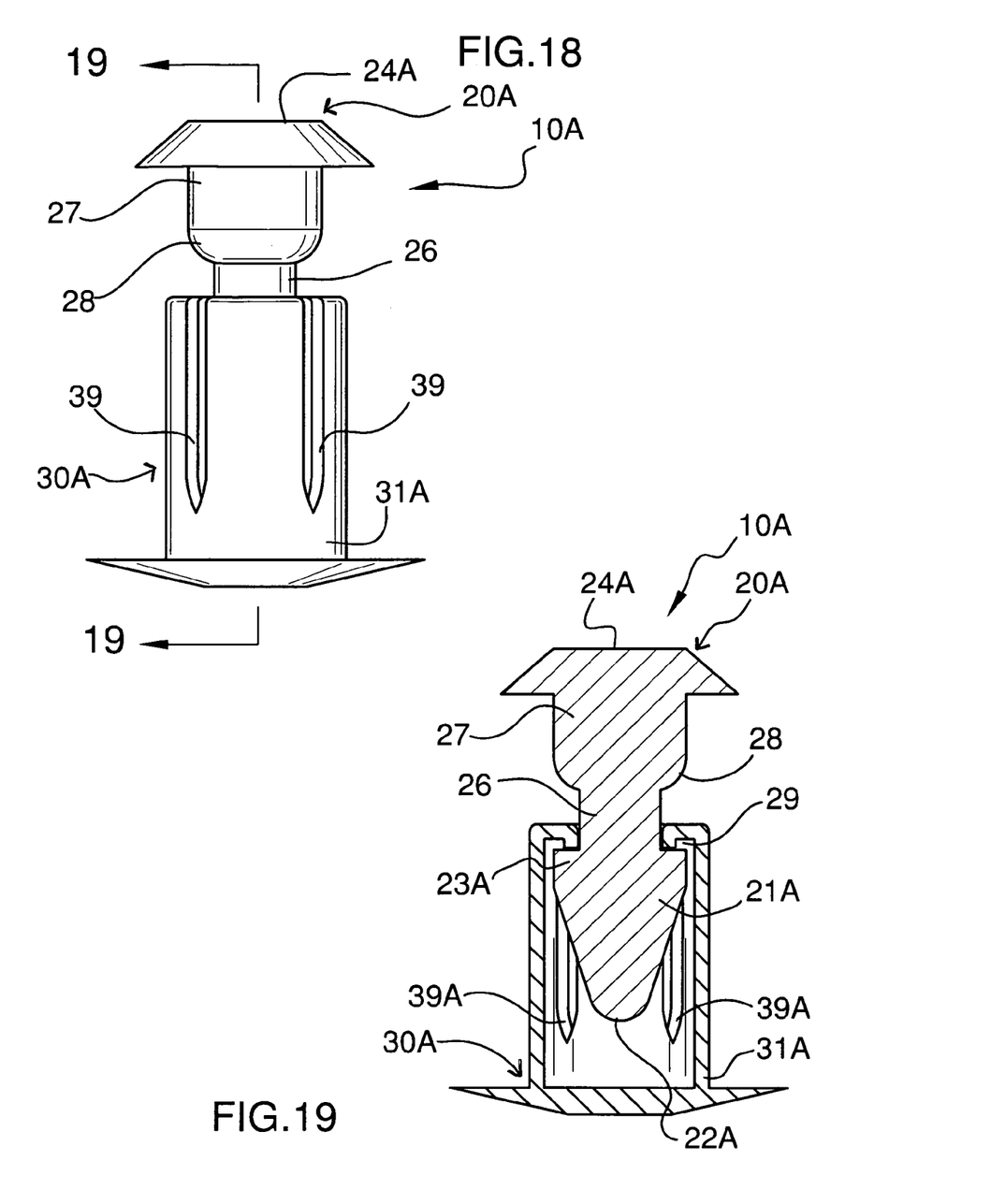
FIG. 18 is a front-elevational view showing an alternate embodiment of the multipurpose fastener kit and associated accessories, in accordance with the present invention.
FIG. 19 is a cross-sectional view of the apparatus shown in FIG. 18, taken along line 19-19.
Figures 20, 21:
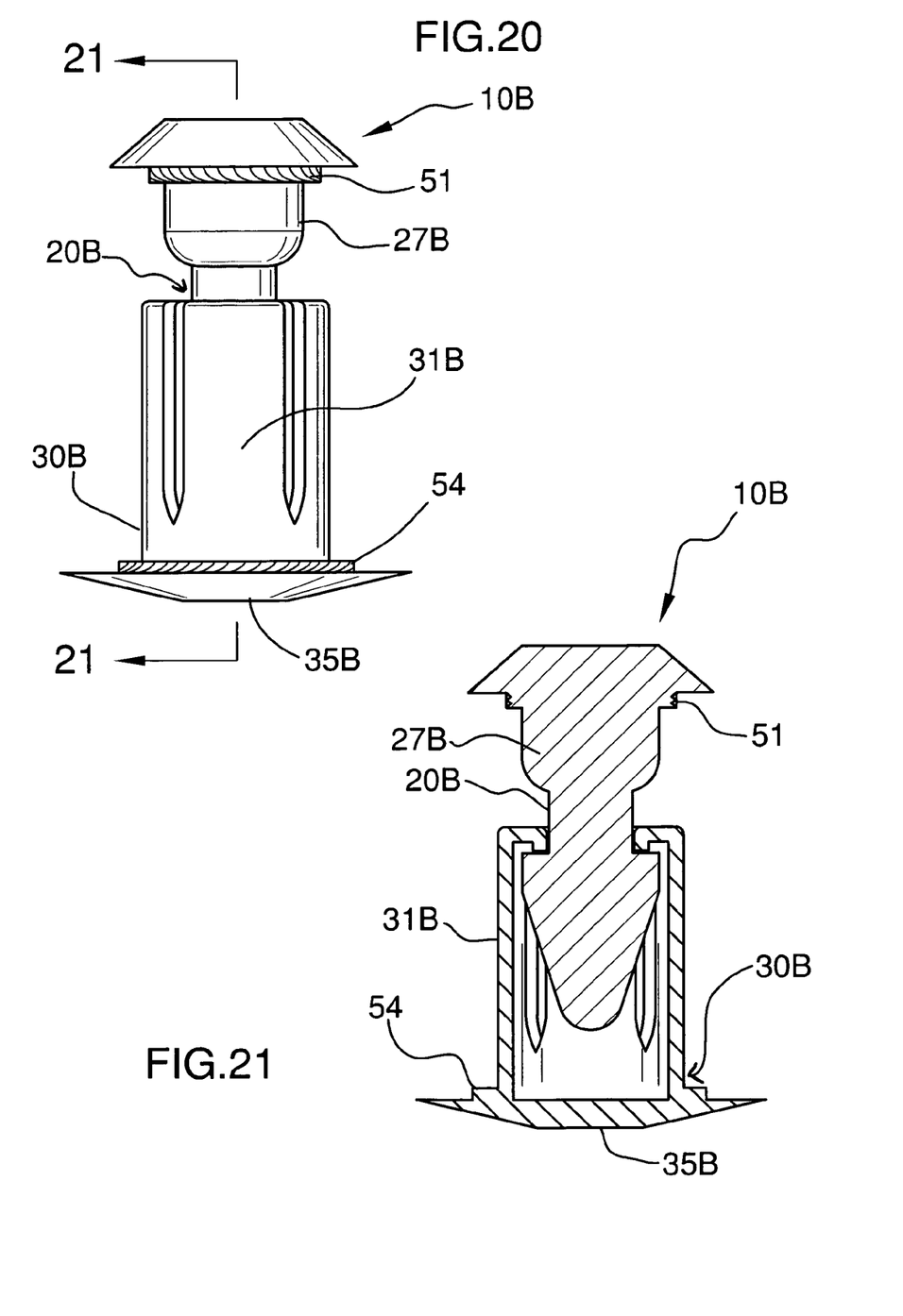
FIG. 20 is a front-elevational view showing a further embodiment of the multipurpose fastener kit and associated accessories, in accordance with the present invention.
FIG. 21 is a cross-sectional view of the apparatus shown in FIG. 20, taken along line 21-21.
Figures 22, 23:
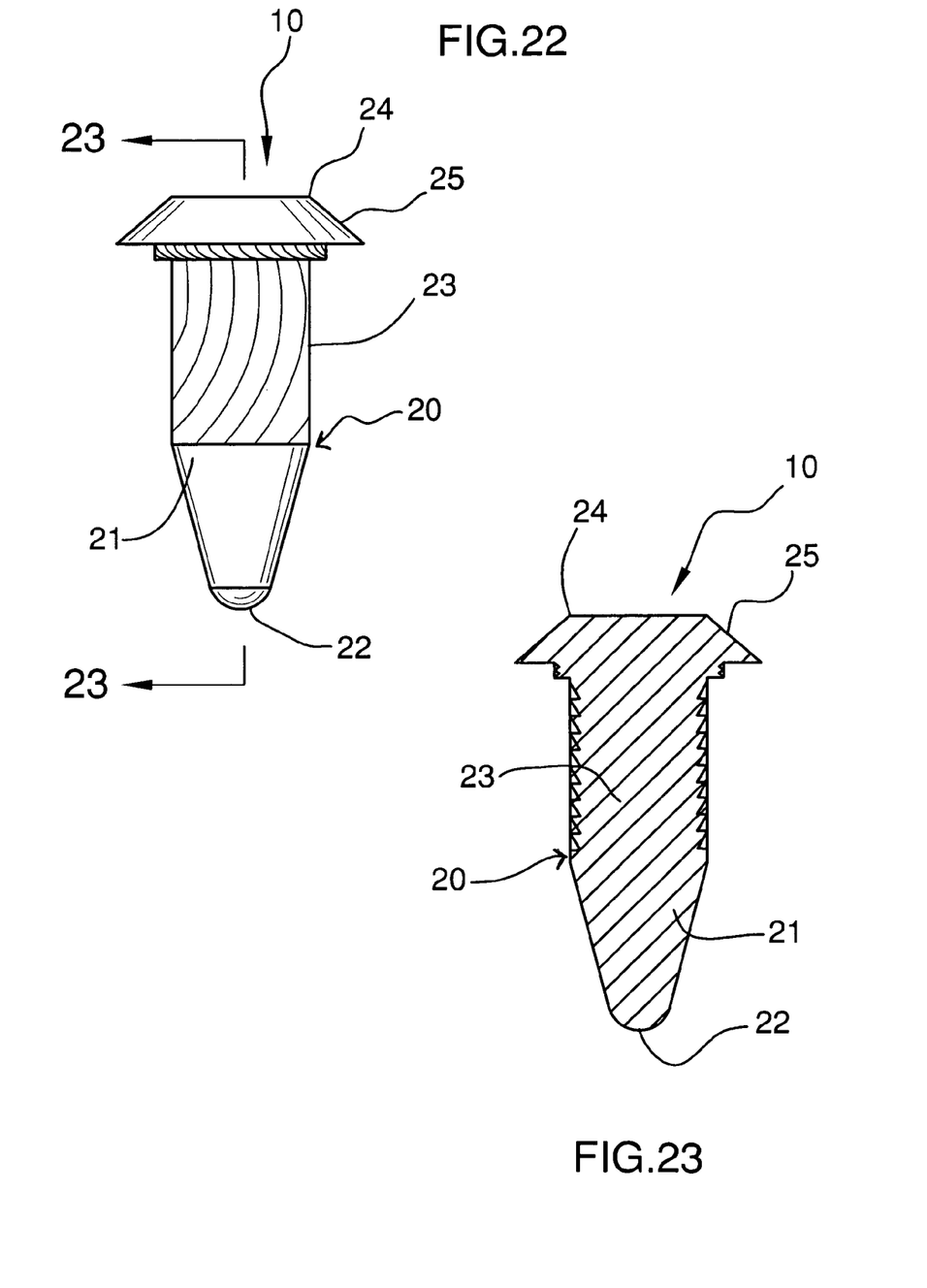
FIG. 22 is a front-elevational view showing a male clip, in accordance with the present invention.
FIG. 23 is a cross-sectional view of the male clip shown in FIG. 22, taken along line 23-23.
Figures 24, 25:
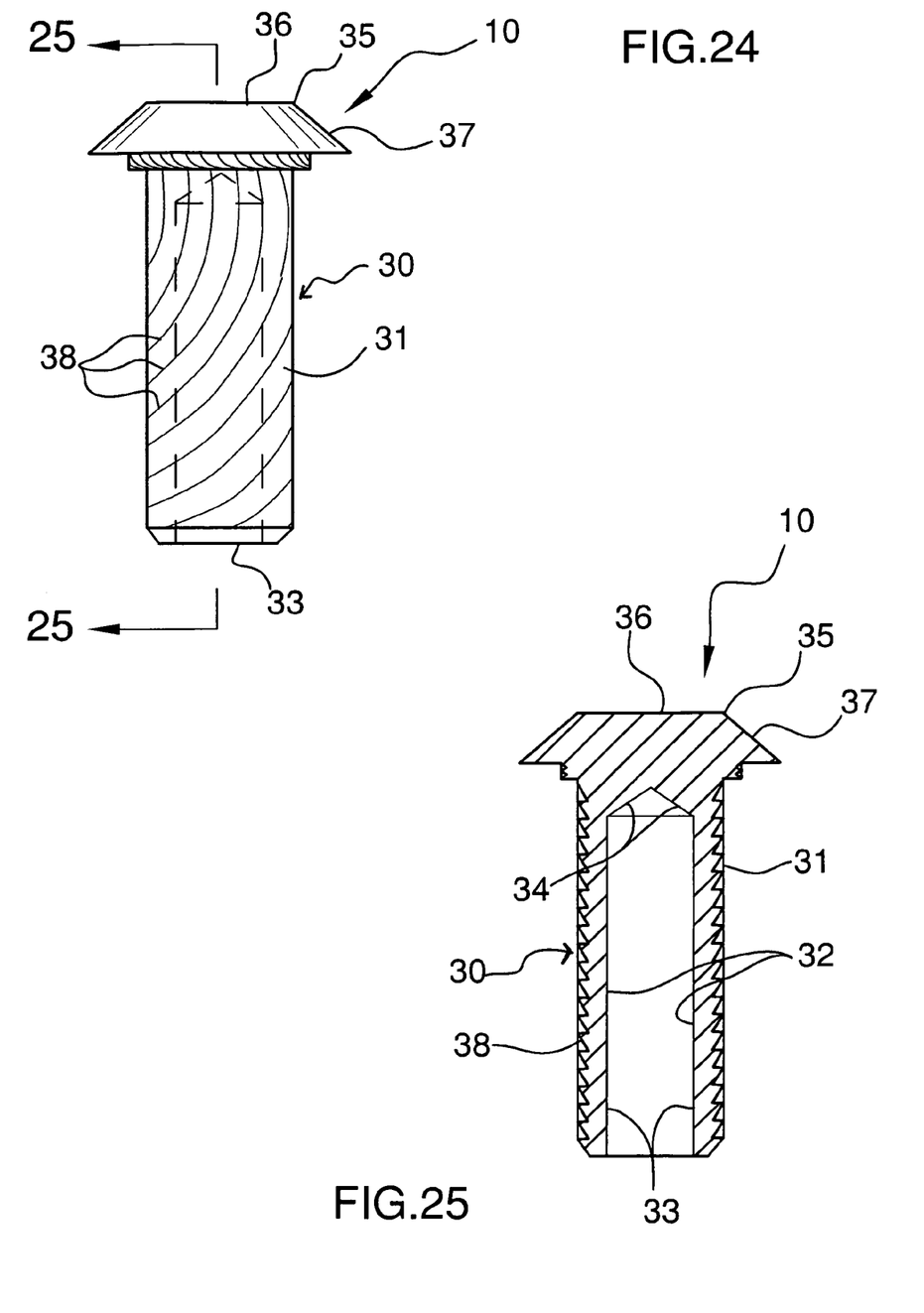
FIG. 24 is a front-elevational view showing a female clip, in accordance with the present invention.
FIG. 25 is a cross-sectional view of the female clip shown in FIG. 24, taken along line 25-25.
Figure 26:
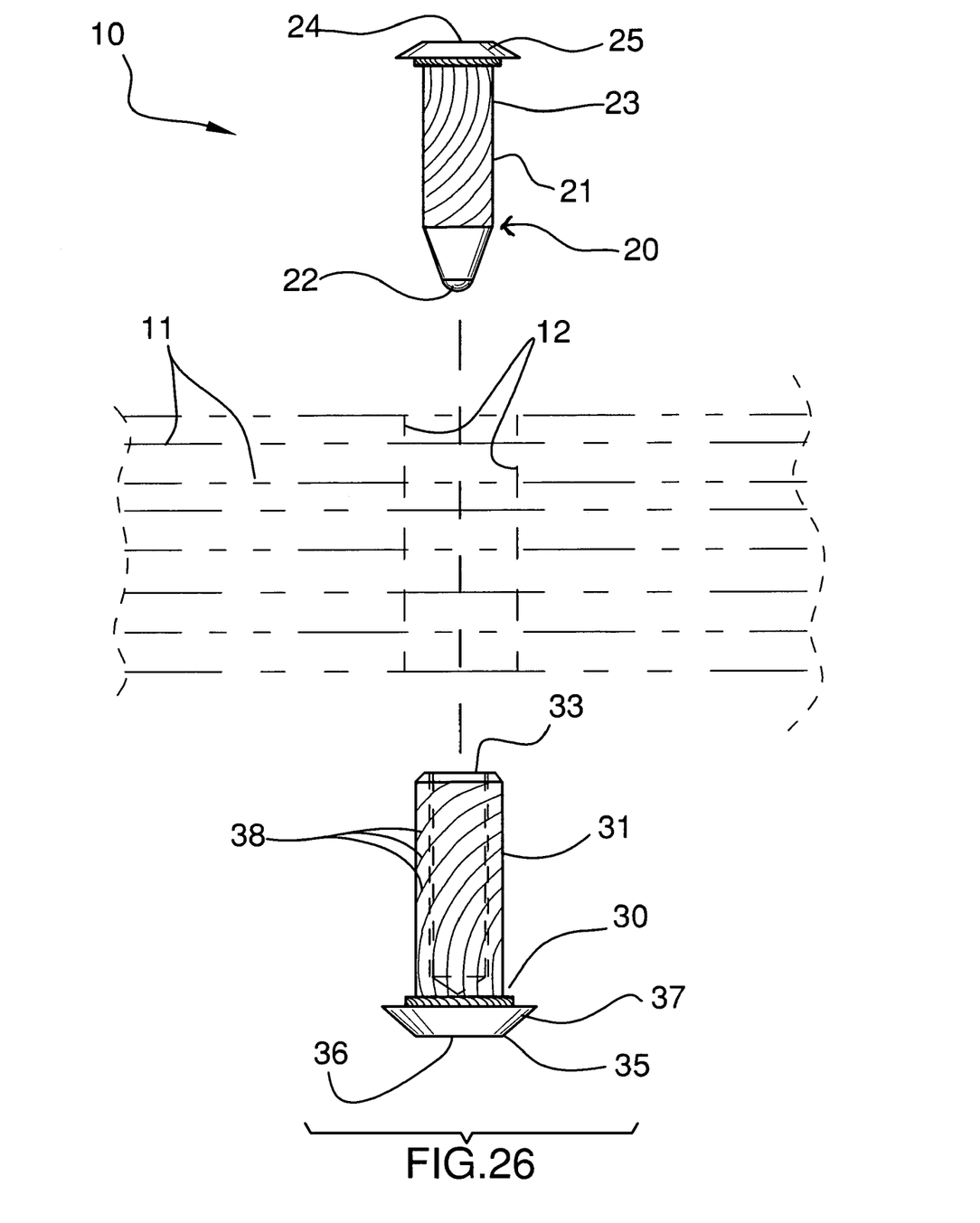
FIG. 26 is a front-elevational view showing a multipurpose fastener kit and associated accessories, in accordance with the present invention.
Figure 27:
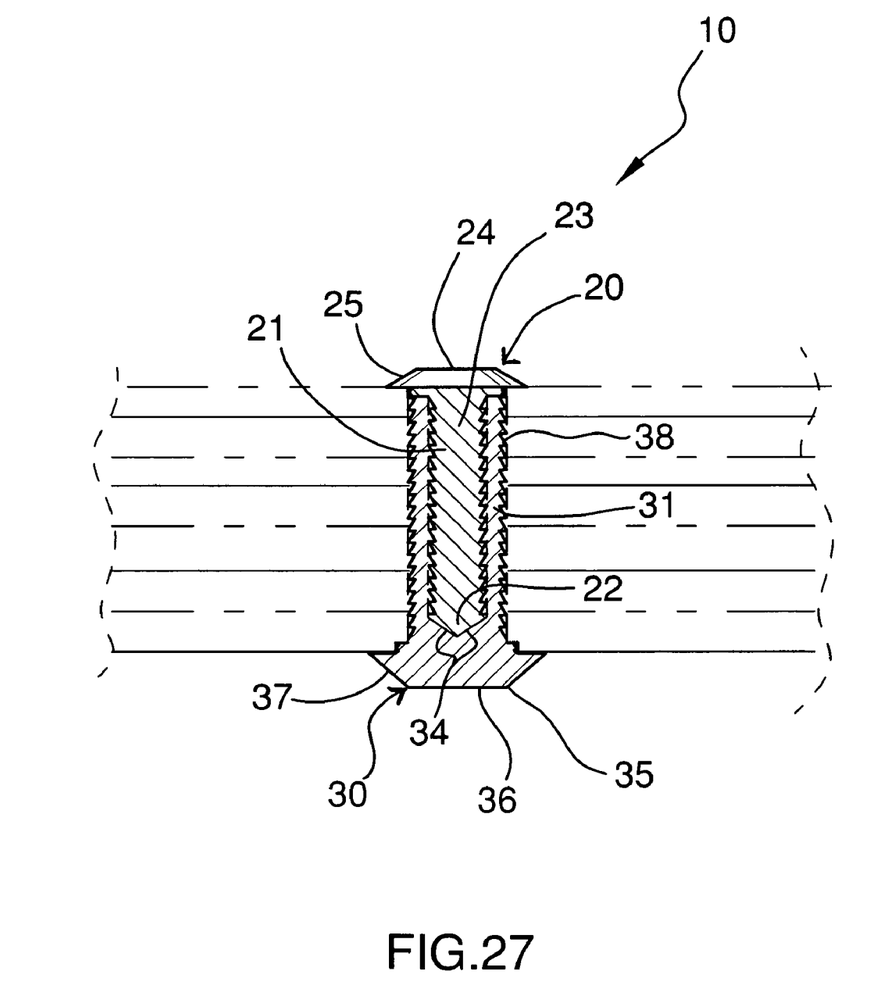
FIG. 27 is a cross-sectional view of the apparatus shown in FIG. 26, showing the male and female clips statically engaged through a plurality of plates.
Figure 28:
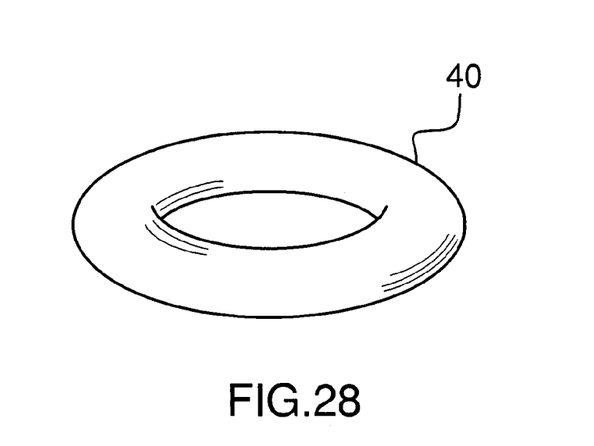
FIGS. 28-31 are perspective views showing alternate embodiments of the present invention.
Figure 29:
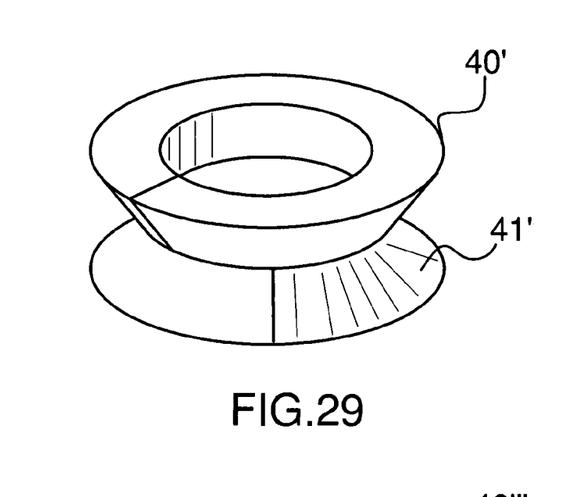
Figure 30:
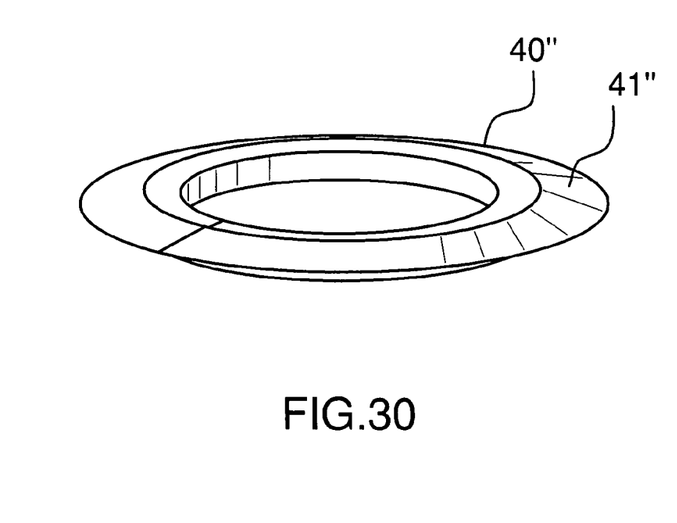
Figure 31:
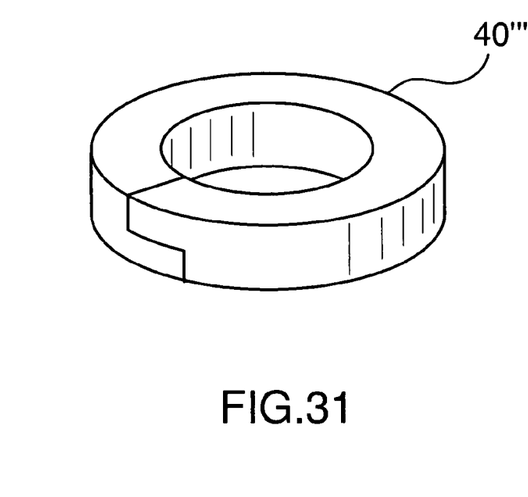

Referring to FIGS. 16 and 17, in a ninth embodiment 10H, the upper portion 23H of the male clip 20H has a fluted outer surface 53H. Such a male clip 20H also has a plug region 27H that has a fluted outer ring 51H monolithically formed therewith. Such a combination of a upper region fluted outer surface 53H and a fluted outer ring 51H are crucial for effectively preventing the male clip 20H from rotating within the female clip 30A and the annular seal 40.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A fastener accessory apparatus for assisting a user to quickly and efficiently fasten a plurality of panels to each other, said fastener accessory apparatus comprising:
   a plurality of male clips, each of said male clips including a body having a monolithically formed and tapered bottom tip having a rounded cone shape, said body further having an upper portion monolithically formed with said bottom tip and provided with a uniform diameter equal to a maximum diameter of said bottom tip, said body further having a striking region monolithically formed with said upper portion, said striking region having a diameter greater than a diameter of said upper portion for providing a sufficient surface area onto which a hammer is struck when inserting said body into a panel, said striking region having a downwardly sloping outer edge equidistantly spaced from a center of said upper portion; and
   a plurality of female clips, each of said female clips having a cylindrical body provided with an axial bore formed therein, said axial bore extending along an entire longitudinal length of said female body wherein said female body has an open end portion and an axially opposed closed end portion, said axial bore having a longitudinal length greater than a sum of associated longitudinal lengths of said bottom tip and said upper portion respectively, said female body further having a striking region monolithically formed with said closed end portion, said female striking region having a surface provided with an outwardly beveled outer edge, said striking surface being axially opposed from said open end portion;
   wherein said male clips are selectively engageable with associated ones of said female clips;
   wherein selected ones of said bodies of said male clips further comprise
   an elongated shank directly conjoined to said upper portion and extending axially upwards therefrom, said shank being spaced from said bottom tip, said shank having a uniform diameter smaller than said maximum diameter of said bottom tip; and
   a plug region monolithically formed with said shank and said striking regions respectively, said plug region having a rounded bottom edge converging downwardly towards said shank, said plug region having a diameter smaller than a diameter of said striking region.

2. The apparatus of claim 1, wherein said upper portion of said male clips have a horizontally registered outer shoulder continuously and uniformly extending about an outer surface of said shaft, wherein said female body has a plurality of linear slits formed therein and traveling parallel to the longitudinal length thereof such that a diameter of said female body can be adapted between compressed and expanded positions and thereby uniformly and directly engage said male clips.

3. The apparatus of claim 1, wherein said striking region of said male clip is directly connected to said open end portion of said female clip after said male clip is inserted into said bore of said female clip.

* * * * *